United States Patent
Kusano et al.

(10) Patent No.: US 10,611,371 B2
(45) Date of Patent: Apr. 7, 2020

(54) SYSTEM AND METHOD FOR VEHICLE LANE CHANGE PREDICTION USING STRUCTURAL RECURRENT NEURAL NETWORKS

(71) Applicants: Toyota Motor Engineering & Manufacturing North America, Inc., Erlanger, KY (US); The Regents of The University of Michigan, Ann Arbor, MI (US)

(72) Inventors: Kristofer D. Kusano, Ann Arbor, MI (US); Sajan Patel, Ann Arbor, MI (US); Brent Griffin, Ann Arbor, MI (US); Jason J. Corso, Ann Arbor, MI (US)

(73) Assignees: Toyota Motor Engineering & Manufacturing North America, Inc., Plano, TX (US); The Regents of The University of Michigan, Ann Arbor, MI (US)

( * ) Notice: Subject to any disclaimer, the term of this patent is extended or adjusted under 35 U.S.C. 154(b) by 0 days.

(21) Appl. No.: 15/858,592

(22) Filed: Dec. 29, 2017

(65) Prior Publication Data
US 2019/0077398 A1 Mar. 14, 2019

Related U.S. Application Data

(60) Provisional application No. 62/558,639, filed on Sep. 14, 2017.

(51) Int. Cl.
*B60W 30/09* (2012.01)
*B60W 30/18* (2012.01)
(Continued)

(52) U.S. Cl.
CPC .. *B60W 30/0956* (2013.01); *B60W 30/18163* (2013.01); *B60W 50/0097* (2013.01);
(Continued)

(58) Field of Classification Search
CPC ....... B60W 30/0956; B60W 30/18163; B60W 50/0097; G05D 1/0088; G05D 1/0214; G06K 9/00825; G08G 1/166; G08G 1/167
See application file for complete search history.

(56) References Cited

U.S. PATENT DOCUMENTS 7,610,121 B2 10/2009 Nishira et al.
8,340,883 B2 12/2012 Arbitmann et al.
(Continued)

OTHER PUBLICATIONS

"Probabilistic Vehicle Trajectory Prediction over Occupancy Grid Map via Recurrent Neural Network," ByeoungDo Kim, Chang Mook Kang, Jaekyum Kim, Seung Hi Lee, Chung Choo Chung, and Jun Won Choi, version 2, Fri, Sep. 1, 2017, arXiv:1704.07049v2 (Year: 2017).*
(Continued)

*Primary Examiner* — Tyler J Lee
(74) *Attorney, Agent, or Firm* — Christopher G. Darrow; Darrow Mustafa PC

(57) ABSTRACT

System, methods, and other embodiments described herein relate to predicting lane changes for nearby vehicles of a host vehicle. In one embodiment, a method includes, in response to detecting that one or more of the nearby vehicles are present proximate to the host vehicle, collecting pose information about the nearby vehicles. The nearby vehicles are traveling proximate to the host vehicle and in a direction of the host vehicle. The method includes analyzing the pose information of the nearby vehicles using separate recurrent units of a structural recurrent neural network (S-RNN) to generate factors according to the lanes. The method includes
(Continued)

generating prediction indicators for the nearby vehicles as a function of the factors for the lanes using the S-RNN. The method includes providing electronic outputs identifying the prediction indicators that specify a likelihood of the nearby vehicles changing between the lanes.

20 Claims, 7 Drawing Sheets

(51) Int. Cl.
    *G05D 1/00*     (2006.01)
    *G08G 1/16*     (2006.01)
    *B60W 30/095*     (2012.01)
    *B60W 50/00*     (2006.01)
    *G06K 9/00*     (2006.01)
    *G05D 1/02*     (2020.01)
    *G06K 9/62*     (2006.01)

(52) U.S. Cl.
    CPC ......... *G05D 1/0088* (2013.01); *G05D 1/0214* (2013.01); *G06K 9/00805* (2013.01); *G06K 9/00825* (2013.01); *G06K 9/6274* (2013.01); *G08G 1/166* (2013.01); *G08G 1/167* (2013.01); *G05D 2201/0213* (2013.01)

(56) References Cited

U.S. PATENT DOCUMENTS

| | | | |
|---|---|---|---|
| 9,159,023 | B2 | 10/2015 | Bone et al. |
| 9,358,984 | B2 | 6/2016 | Silvin |
| 9,381,916 | B1 | 7/2016 | Zhu et al. |
| 9,665,100 | B2 | 5/2017 | Shashua et al. |
| 2005/0015203 | A1 | 1/2005 | Nishira |
| 2012/0022764 | A1 | 1/2012 | Tang et al. |
| 2013/0085976 | A1* | 4/2013 | Bone ............... B60W 30/18163 706/46 |
| 2015/0266477 | A1 | 9/2015 | Schmudderich |
| 2015/0291146 | A1 | 10/2015 | Prakah-Asante et al. |
| 2015/0321699 | A1 | 11/2015 | Rebhan et al. |
| 2015/0339589 | A1 | 11/2015 | Fisher |
| 2015/0353094 | A1 | 12/2015 | Harda et al. |
| 2016/0046170 | A1 | 2/2016 | Lu |
| 2016/0129919 | A1 | 5/2016 | Kubo |
| 2017/0154225 | A1 | 6/2017 | Stein |
| 2018/0074505 | A1* | 3/2018 | Lv ........................ B60W 30/12 |
| 2018/0304891 | A1* | 10/2018 | Heidenreich ...... G01C 21/3602 |

OTHER PUBLICATIONS

"Structural-RNN: Deep Learning on Spatio-Temporal Graphs," Ashesh Jain, Amir R. Zamir, Silvio Savarese and Ashutosh Saxena, version 3, Apr. 11, 2016, arXiv:1511.05298v3 (Year: 2016).*

J. Levinson, J. Askeland, J. Becker, J. Dolson, D. Held, S. Kammel, J. Z. Kolter, D. Langer, O. Pink, V. Pratt, et al., "Towards fully autonomous driving: Systems and algorithms," in Intelligent Vehicles Symposium (IV), 2011 IEEE. IEEE, 2011, pp. 163-168.

K. Murphy, "Dynamic Bayesian Networks: Representation, Inference and Learning," Ph.D. dissertation, University of California at Berkeley, Computer Science Division, 2002.

A. Jain, H. S. Koppula, B. Raghavan, S. Soh, and A. Saxena, "Car that knows before you do: Anticipating maneuvers via learning temporal driving models," in The IEEE International Conference on Computer Vision (ICCV), Dec. 2015.

K. Cho, B. van Merrienboer, C. Gulcehre, F. Bougares, H. Schwenk, and Y. Bengio, "Learning phrase representations using rnn encoderdecoder for statistical machine translation," in Conference on Empirical Methods in Natural Language Processing (EMNLP 2014), 2014.

S. Hochreiter and J. Schmidhuber, "Long short-term memory," Neural Comput., vol. 9, No. 8, pp. 1735-1780, Nov. 1997. [Online]. Available: http://dx.doi.org/10.1162/neco.1997.9.8.1735.

A. Jain, A. Singh, H. S. Koppula, S. Soh, and A. Saxena, "Recurrent neural networks for driver activity anticipation via sensory-fusion architecture," in 2016 IEEE International Conference on Robotics and Automation (ICRA), May 2016, pp. 3118-3125.

A. Jain, A. R. Zamir, S. Savarese, and A. Saxena, "Structural-rnn: Deep learning on spatio-temporal graphs," Jun. 2016.

E. Galceran, A. G. Cunningham, R. M. Eustice, and E. Olson, "Multipolicy decision-making for autonomous driving via changepoint-based behavior prediction," in Proceedings of Robotics: Science and Systems (RSS), Rome, Italy, Jul. 2015.

J. Schlechtriemen, A. Wedel, J. Hillenbrand, G. Breuel, and K. D. Kuhnert, "A lane change detection approach using feature ranking with maximized predictive power," in 2014 IEEE Intelligent Vehicles Symposium Proceedings, Jun. 2014, pp. 108-114.

J. P. Snyder, "Map projections: A working manual," US Government Printing Office, Tech. Rep., 1987.

C. M. Bishop, Pattern Recognition and Machine Learning (Information Science and Statistics). Secaucus, NJ, USA: Springer-Verlag New York, Inc., 2006.

S. Nowozin, C. H. Lampert, et al., "Structured learning and prediction in computer vision," Foundations and Trends R in Computer Graphics and Vision, vol. 6, No. 3-4, pp. 185-365, 2011.

J. L. Ba, J. R. Kiros, and G. E. Hinton, "Layer normalization," normalizaarXiv:1607.06450v1 [stat.ML] Jul. 21, 2016.

S. Semeniuta, A. Severyn, and E. Barth, "Recurrent dropout without memory loss," 2016. http://arxiv.org/abs/1603.05118v2.

D. P. Kingma and J. Ba, "Adam: A method for stochastic optimization," arXiv:1412.6980v9 [cs.LG] Jan. 30, 2017.

M. M. Minderhoud and P. H. Bovy, "Extended time-to-collision measures for road traffic safety assessment," Accident Analysis & Prevention, vol. 33, No. 1, pp. 89-97, 2001.

* cited by examiner

SYSTEM AND METHOD FOR VEHICLE LANE CHANGE PREDICTION USING STRUCTURAL RECURRENT NEURAL NETWORKS

CROSS-REFERENCE TO RELATED APPLICATIONS

This application claims benefit of U.S. Provisional Application No. 62/558,639, filed on, Sep. 14, 2017, which is herein incorporated by reference in its entirety.

TECHNICAL FIELD

The subject matter described herein relates in general to a system and method for predicting lane changes and, more particularly, to training and using structural recurrent neural networks (S-RNNs) to predict lane changes of nearby vehicles.

BACKGROUND

Vehicles may be equipped with many sensors that facilitate perceiving other vehicles, obstacles, and pedestrians in a surrounding environment. Perception and reasoning by the systems of such vehicles facilitates the vehicles (e.g., autonomous or semi-autonomous) in making decisions according to the perceived information. However, making decisions in this way is generally only effective if sensors work reliably, which is not always a guarantee for the noted systems when deployed in the real-world amongst other vehicles.

In the event of sensor failure, the vehicle systems can rely on past sensor readings for decision making. For example, autonomous vehicles generally plan and execute maneuvers while safely avoiding other obstacles on the road. To do so, the vehicle systems use knowledge of other vehicles surrounding the autonomous vehicle and information about other aspects of the environment (e.g., lane markers, obstacles, etc.) to plan into the near future. However, lack of data from the failed sensors can cause difficulties in performing the planning.

SUMMARY

In one embodiment, example systems and methods relate to a manner of predicting lane changes by surrounding vehicles. In one aspect, disclosed systems and methods improve lane change prediction by, for example, using a structural recurrent neural network (S-RNN) that is based, at least in part, on a factor graph to predict lane changes of nearby vehicles. The factor graph generally defines spatiotemporal relationships between the host vehicle and the nearby vehicles that are traveling in the same lane and surrounding lanes. Thus, the S-RNN is implemented with a structure that is representative of the factor graph to learn factor functions associated with defined aspects of the factor graph.

Accordingly, in one embodiment, a disclosed system monitors for nearby vehicles that correlate with positions defined within the factor graph relating to the host vehicle. As the system detects the nearby vehicles, the system also collects pose information about the nearby vehicles that indicates relative distances, trajectories, and so on. The system uses the pose information as an input to the trained S-RNN. Accordingly, the system leverages the S-RNN to analyze the pose information for the nearby vehicles in the respective lanes. As a result, the system generates prediction indicators for the respective nearby vehicles that identify a likelihood of lane changes for the respective nearby vehicles.

Moreover, the disclosed system, in one embodiment, generates the prediction indicators using pose information from a previous one to five seconds in order to predict the likelihood of lane changes out to a prediction horizon. The prediction horizon is, for example, three seconds into the future. Thus, the system can characterize movements of the nearby vehicles between lanes for an upcoming period of time into the future defined by the prediction horizon. Consequently, the system can provide for anticipating actions of the nearby vehicles into the future using past sensor data (i.e., the pose information). In this way, when the vehicle experiences sensor failures or otherwise can benefit from anticipating movements of the nearby vehicles, the predicted movements can be leveraged by path planning, obstacle avoidance, or other autonomous/semi-autonomous driving systems to improve safety and general operation of the noted aspects through improved knowledge of likely movements.

In one embodiment, a lane prediction system for predicting lane changes for nearby vehicles of a host vehicle is disclosed. The lane prediction system includes one or more processors and a memory that is communicably coupled to the one or more processors. The memory stores a monitoring module including instructions that when executed by the one or more processors cause the one or more processors to, in response to detecting that one or more of the nearby vehicles are present proximate to the host vehicle, collect, using at least one sensor of the host vehicle, pose information about the nearby vehicles. The one or more of the nearby vehicles are traveling in lanes of a roadway proximate to the host vehicle and in a direction of travel of the host vehicle. The memory stores a prediction module including instructions that when executed by the one or more processors cause the one or more processors to analyze the pose information of the nearby vehicles using separate recurrent units of a structural recurrent neural network (S-RNN) to generate factors according to the lanes. The prediction module includes instructions to generate prediction indicators for the nearby vehicles as a function of the factors for the lanes using the S-RNN. The prediction module includes instructions to provide electronic outputs identifying the prediction indicators that specify a likelihood of the nearby vehicles changing between the lanes.

In one embodiment, a non-transitory computer-readable medium for predicting lane changes for nearby vehicles of a host vehicle is disclosed. The non-transitory computer-readable medium stores instructions that when executed by one or more processors cause the one or more processors to perform the disclosed functions. The instructions include instructions to, in response to detecting that one or more of the nearby vehicles are present proximate to the host vehicle, collect, using at least one sensor of the host vehicle, pose information about the nearby vehicles. The one or more of the nearby vehicles are traveling in lanes of a roadway proximate to the host vehicle and in a direction of travel of the host vehicle. The instructions include instructions to analyze the pose information of the nearby vehicles using separate recurrent units of a structural recurrent neural network (S-RNN) to generate factors according to the lanes. The instructions include instructions to generate prediction indicators for the nearby vehicles as a function of the factors for the lanes using the S-RNN. The instructions include instructions to provide electronic outputs identifying the prediction indicators that specify a likelihood of the nearby vehicles changing between the lanes.

In one embodiment, a method for predicting lane changes for nearby vehicles of a host vehicle is disclosed. The method includes, in response to detecting that one or more of the nearby vehicles are present proximate to the host vehicle, collecting, using at least one sensor of the host vehicle, pose information about the nearby vehicles. The one or more nearby vehicles are traveling in lanes of a roadway proximate to the host vehicle and in a direction of travel of the host vehicle. The method includes analyzing the pose information of the nearby vehicles using separate recurrent units of a structural recurrent neural network (S-RNN) to generate factors according to the lanes. The method includes generating prediction indicators for the nearby vehicles as a function of the factors for the lanes using the S-RNN. The method includes providing electronic outputs identifying the prediction indicators that specify a likelihood of the nearby vehicles changing between the lanes.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with predicting lane changes of nearby vehicles when traveling on a roadway are disclosed. As mentioned previously, an autonomous vehicle plans a path through an environment according to surrounding obstacles and the roadway. In general, the autonomous vehicle achieves this planning by using sensors to detect the obstacles and other aspects of the environment. However, various difficulties can complicate the noted detection and planning. For example, when one or more sensors of the vehicle fail, the autonomous vehicle may no longer be able to perceive the nearby vehicles but is still traveling on the roadway and thus still must navigate. That is, the autonomous vehicle, upon detection of a sensor failure, may need to execute an emergency pullover maneuver for which knowledge of the nearby vehicles is not directly available but would be useful.

Therefore, in one embodiment, a lane prediction system uses previous sensor data from, for example, a previous 1-5 seconds in combination with a structural recurrent neural network that is derived, at least in part, from a factor graph to predict lane changes of nearby vehicles. The previous sensor data can include pose information (e.g., position, trajectory, etc.) that is generated by sensors such as a LIDAR, GPS, inertial measurement units (IMU) and so on.

The lane prediction system generates, for example, the predictions about movements of the nearby vehicles operated manually by human drivers for a prediction horizon of 1-3 seconds into the future. Thus, the lane prediction system generates a prediction indicator for individual nearby vehicles that indicates whether a vehicle is likely to perform a left or right lane change maneuver or maintain a present lane up to three seconds from a time when the prediction is generated. In this way, the autonomous vehicle can predict near-term movements of the nearby vehicles to improve path planning and/or executing emergency maneuvers.

Figure 1:
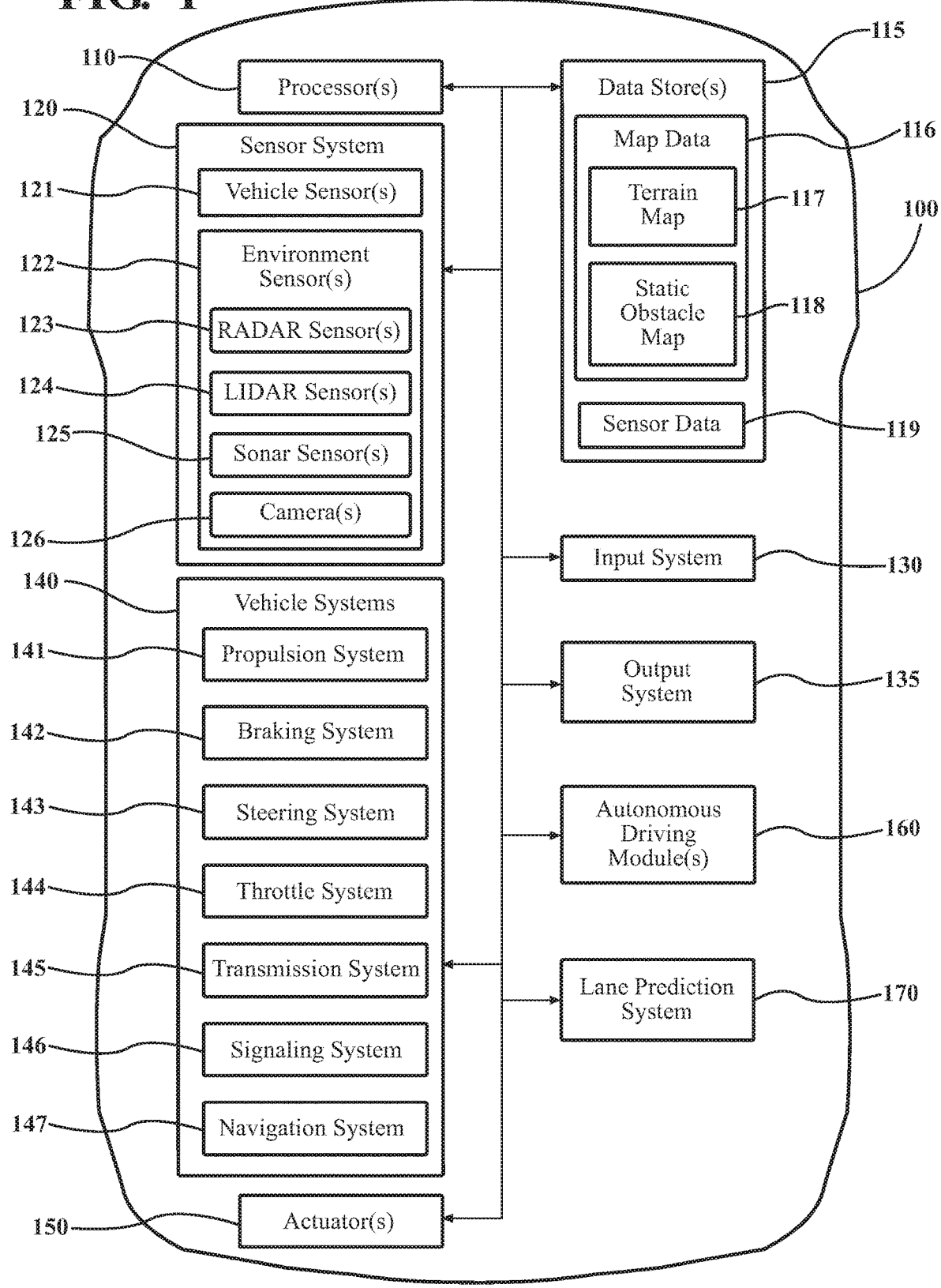
FIG. 1 illustrates one embodiment of a vehicle within which systems and methods disclosed herein may be implemented.

Referring to FIG. 1, an example of the vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, can operate/navigate at least semi-autonomously and/or can indicate contextual information to an operator/driver, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a lane prediction system 170 that is implemented to perform methods and other functions as disclosed herein relating to improving the operation of the vehicle 100 through anticipating movements of nearby vehicles and, more specifically, in relation to predicting lane changes. The noted functions and methods will become more apparent with a further discussion of the figures.

Figure 2:
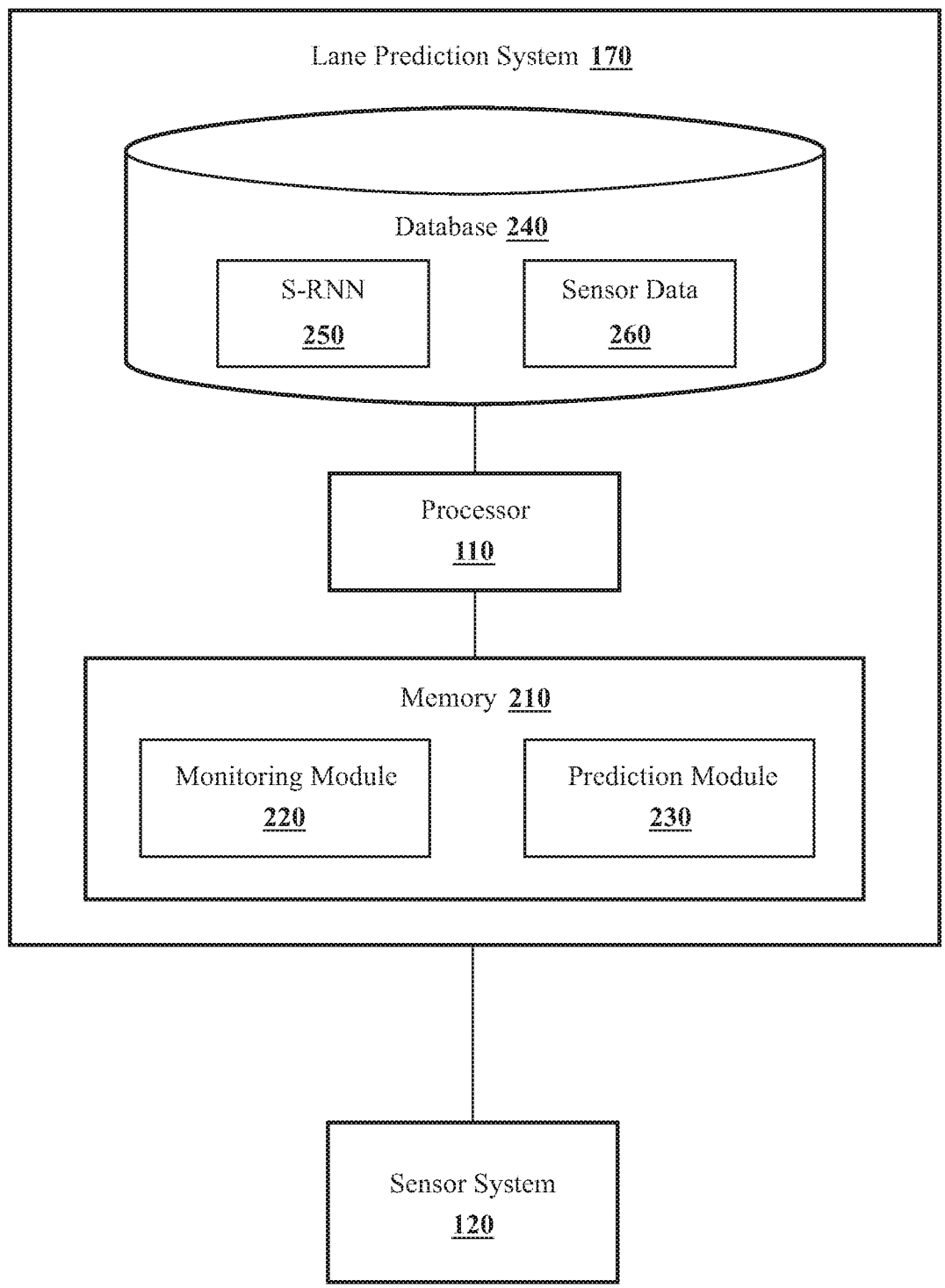
FIG. 2 illustrates one embodiment of a lane prediction system that is associated with predicting lane changes of nearby vehicles.

With reference to FIG. 2, one embodiment of the lane prediction system 170 of FIG. 1 is further illustrated. The lane prediction system 170 is shown as including a processor 110 from the vehicle 100 of FIG. 1. Accordingly, the processor 110 may be a part of the lane prediction system 170, the lane prediction system 170 may include a separate processor from the processor 110 of the vehicle 100, or the lane prediction system 170 may access the processor 110 through a data bus or another communication path. In one embodiment, the lane prediction system 170 includes a memory 210 that stores a monitoring module 220 and a prediction module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the monitoring module 220 generally includes instructions that function to control the processor 110 to receive sensor data 260 from one or more sensors 120 of the vehicle 100. The sensor data 260 is, in one embodiment, observations of one or more objects in an environment proximate to the vehicle 100 and/or other aspects about the surroundings. Thus, the monitoring module 220 can detect surrounding vehicles/objects and generate tracks or other information about the objects/vehicles from the sensor data 260. The tracks are, for example, trajectories that include present velocities, positions, and headings for the object as determined from the respective sensor inputs.

The lane prediction system 170 detects the relative position and orientation of nearby vehicles up to, for example, 120 meters away using the sensor data 260. In one embodiment, the monitoring module 220 continuously scans a stream of the sensor data 260 collected from the vehicle sensors 120 in order to determine when a nearby vehicle passes into an area around the vehicle 100. In various embodiments, the monitoring module 220 is configured to detect nearby vehicles at various distances according to, for example, current speeds, prediction horizons, sensor ranges, and so on. Moreover, the monitoring module 220 collects the data, in one embodiment, at 25 Hz or another suitable sampling rate.

Figure 3:
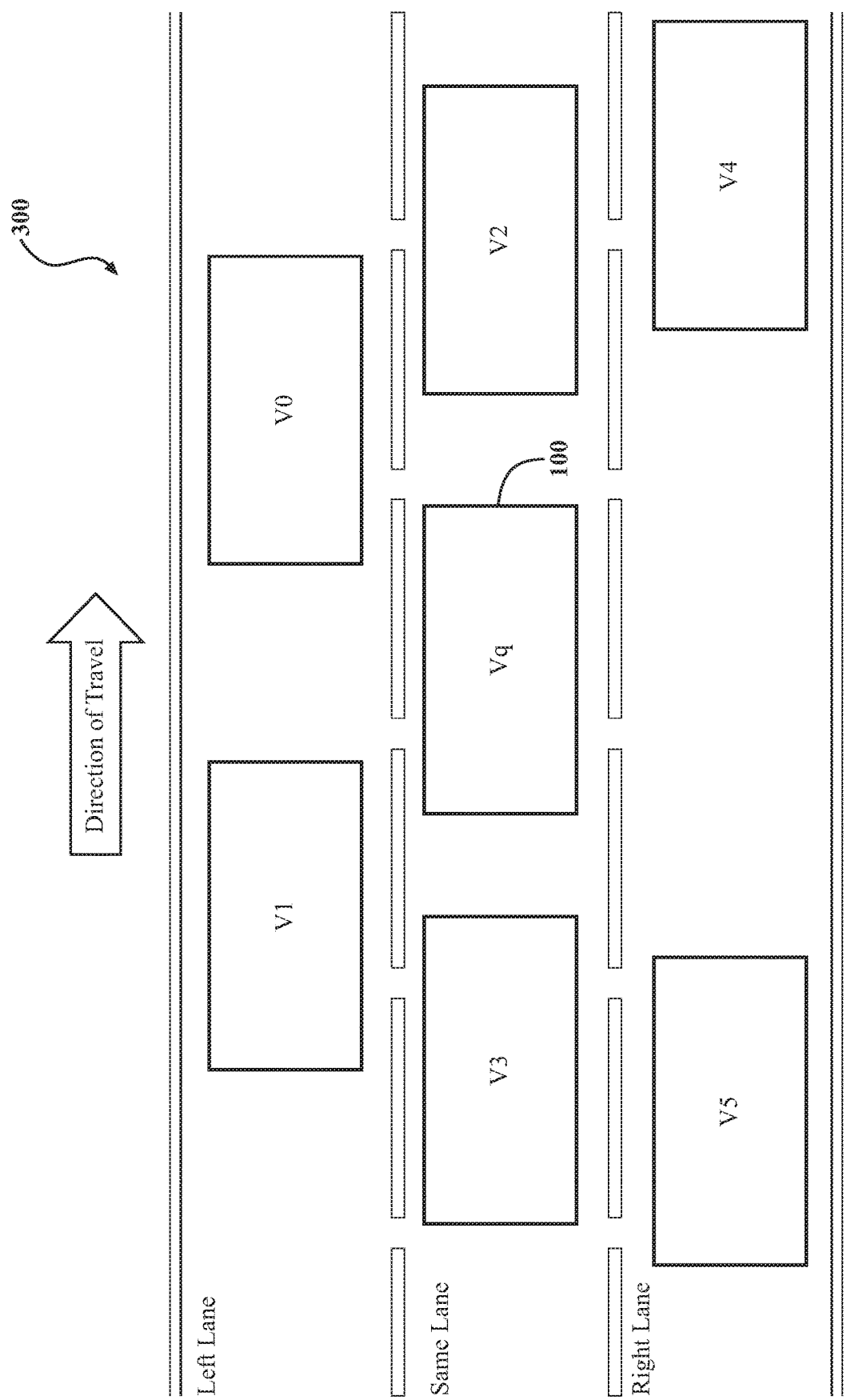
FIG. 3 illustrates one example of a neighboring context of nearby vehicles in lanes surrounding the vehicle 100.
Figure 4:
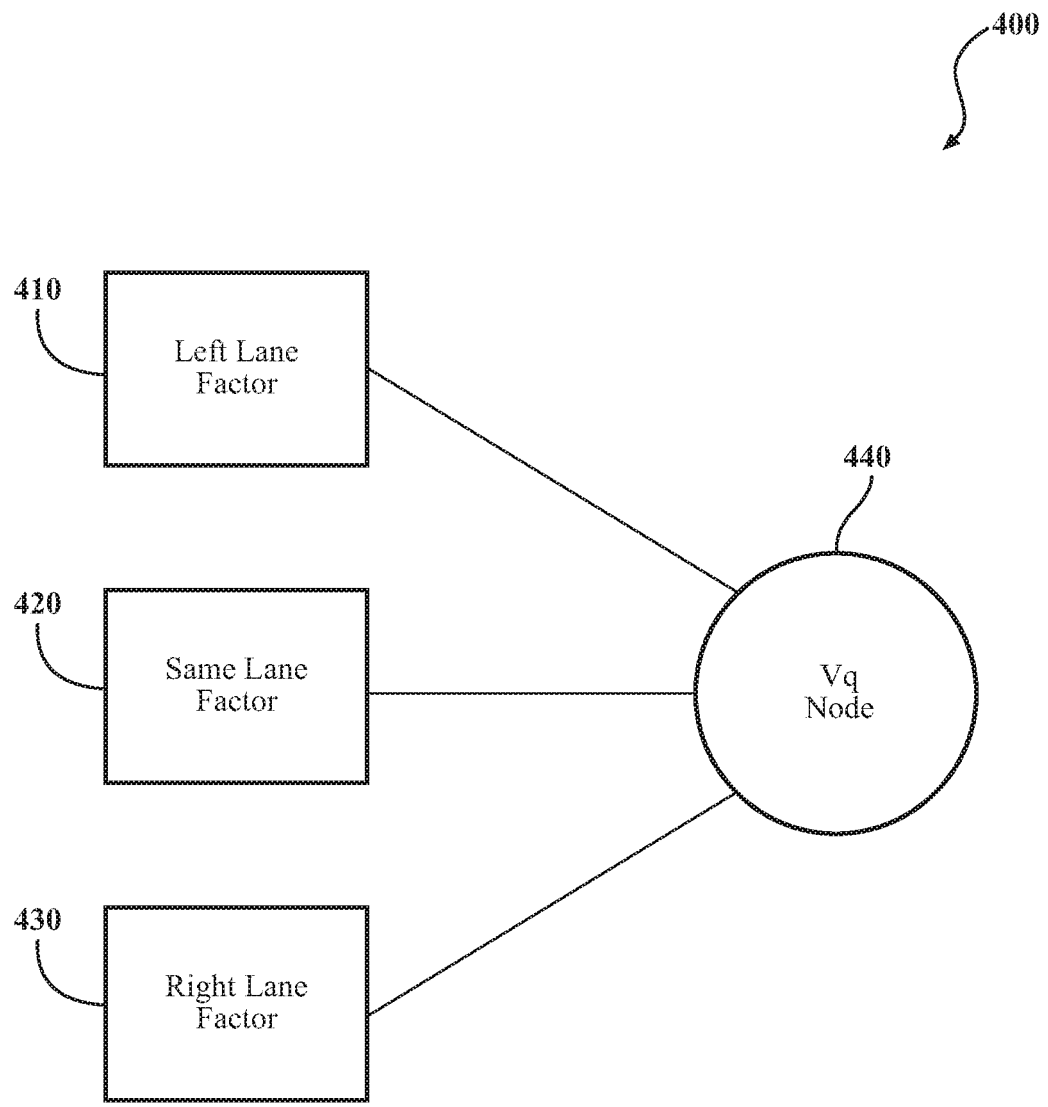
FIG. 4 illustrates one embodiment of a three-lane factor graph for lane change prediction at a specific time instance.

In either case, the monitoring module 220 detects and tracks the nearby vehicles in order to initially identify a presence of the nearby vehicles and, once detected, to correlate the nearby vehicles with positions in the factor graph. As shown in FIG. 3, a six-vehicle context diagram 300 is used as, for example, a template that includes representations of positions of vehicles that are analyzed in relation to the vehicle 100. The diagram 300 includes positions for vehicles ahead and behind the vehicle 100, and vehicles in the left and right lanes that are both ahead and behind the vehicle 100. The context represented in FIG. 3 illustrates the lane-based interactions between the nearby vehicles. Accordingly, the monitoring module 220, upon detecting the presence of a nearby vehicle correlates the detected vehicle with one of the positions in the diagram 300 for subsequent analysis. Since not all of the positions for the nearby vehicles are present at each time step in natural driving, the monitoring module 220 can include indicator variables as inputs to the S-RNN 250 to indicate the absence of vehicles for particular positions.

Additionally, in one aspect, the lane prediction system 170 uses high-definition maps that include lane-level information (e.g., lane widths, markings, curvature, GPS coordinates, etc.) along with GPS measurements and the relative detections of nearby vehicles to localize the vehicle and the nearby vehicles on the map. Furthermore, in one embodiment, the monitoring module 220 projects the GPS coordinates of the vehicle 100 into a world-fixed frame using the Mercator projection, and the relative poses of the nearby vehicles into the frame to determine absolute poses. Along with the vehicle poses, the monitoring module 220, in one example, leverages the maps to determine the lane in which the vehicle 100 and the nearby vehicles are traveling. In this way, the monitoring module 220 can correlate the nearby vehicles that are present with associated positions in the diagram for generating the prediction indicators as discussed subsequently.

Moreover, in one embodiment, the lane prediction system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes the S-RNN 250 along with, for example, sensor data 260 and or other information that is used by the module 230. For example, the database 240 can include location coordinates (e.g., longitude and latitude), relative map coordinates or tile identifiers, time/date stamps from when the separate sensor data 260 was generated, and so on. Moreover, the S-RNN 250 may include various data structures storing learned information about lane changes that are used to formulate predictions of lane changes. Additionally, in further embodiments, the database 240 and/or the memory 210 store the S-RNN 250 in various portions.

In one embodiment, the prediction module 230 generally includes instructions that function to control the processor 110 to predict lane changes of surrounding vehicles. Moreover, while the S-RNN 250 is discussed as being stored in the database 240, in one or more embodiments, the S-RNN 250 is at least partially integrated with the prediction module 230. That is, for example, functional logic of the S-RNN 250 can be implemented within the prediction module 230 and executed on the processor 110 while the noted data structures may be stored in the database 240 and/or in the memory 210. In either case, the prediction module 230 implements the S-RNN 250 to predict lane changes of nearby vehicles.

As noted, the prediction module 230 implements a structural-RNN 250 to analyze the sensor data 260 and generate prediction indicators that identify a likelihood of particular lane changes for the nearby vehicles (e.g., left, same, right). As previously mentioned, the S-RNN 250 is derived from, for example, a graphical model that captures spatiotemporal interactions between the nearby vehicles in the same and adjacent lanes. To model lane-wise interactions, the graphical model includes individual factors for the right, left, and same lanes that combines the sensor data 260 (e.g., pose and map-based data) about the nearby vehicles that are within respective lanes. The graphical model can be, for example, unrolled over each time step of a sequence of past sensor observations to predict the future lane change maneuver.

However, because the graphical model alone uses a parameterization that is structured, in one example, manually using domain-specific knowledge, and weights optimized using various methods, the graphical model encounters various difficulties. In contrast, recurrent neural networks (RNNs) can be trained end-to-end for various tasks automatically without manual interaction.

The structural RNN 250 bridges the difficulties associated with the graphical models such as factor graphs and is thus implemented by the lane prediction system 170. For example, the prediction module 230 implements the structural RNN 250 using RNN units connected in a form that is representative of the factor graph. Briefly consider FIG. 4, which illustrates an example factor graph 400 that is associated with the diagram 300 of FIG. 3. The factor graph 400 includes a separate factor for each of the three lanes. For example, the factor graph 400 includes a left lane factor 410, a same lane factor 420, and a right lane factor 430. The single target node 440 represents the future lane change maneuver random variable. The factor graph 400 represents lane-based interactions of vehicles for a given time step; however, there are additional dynamics factors for each lane (not displayed) that, for example, model how vehicles move between time steps.

The S-RNN 250 that is derived from the factor graph 400 employs the interpretable, high-level spatiotemporal structure of the factor graph 400 while using RNN units specifically to learn rich, nonlinear factor and node functions represented in the factor graph 400. The prediction module 230 uses the S-RNN 250 trained end-to-end and unrolled over each step in the temporal sequence at inference time to make the predictions of lane changes for the various nearby vehicles. Consequently, following along with the methodology of Structural RNNs, the lane-based factor graph 400 is converted into the Structural RNN 250 to learn rich factor models for lane change prediction.

Accordingly, in one embodiment, a graphical model (e.g., the graph 400) associated with the S-RNN 250 is used to capture the temporal evolution of nearby vehicles and neighbors as well as lane-based spatial interactions to predict future lane changes. The graph 400 is transformed into the S-RNN 250 that is embedded within the lane prediction system 170 to learn factor functions that characterize the noted interactions.

Thus, in one embodiment, the lane prediction system 170 provides a processing framework in the form of the S-RNN 250 that accepts electronic inputs including at least the pose information and lane information (e.g., a number and configuration of lanes) and produces lane change predictions. For example, the prediction module 230 implements the S-RNN 250 to represent an $i^{th}$ vehicle at each time step t with the following state vector $v^i = [x^i, y^i, \psi^i, n_l, n_r, n_t]^T$, where x and y are the absolute positions of the vehicle in meters in the world-fixed frame, $\psi$ is a heading angle of the vehicle in radians, $n_l$ is the number of lanes to the left of the vehicle, $n_r$ is the number of lanes to the right of the vehicle, and $n_t$ is the number of total lanes on the roadway in the direction of travel of the vehicle 100. Thus, the prediction module 230 employs the S-RNN 250 using a sequence of historical states over time for each vehicle as represented by $V^i = [v^i_{th}, \ldots, v^i_t]$, where th is the a first historical time step (e.g., earliest) to include in the sequence.

For each vehicle at each time step, there are three possible lane change maneuvers that can occur at a future time step $t_f$—left lane change, right lane change, and no lane change. In one aspect, the prediction module 230 determines at least a portion of the lane change maneuvers by examining the change in lane identifiers provided in a map of lanes on the roadway between times t and $t_f$. The prediction module 230 can represent these labels as one-hot vector $y^i_t$ for each sample and annotates each vehicle sample $V^i_t$ with its future lane change label vector.

For a given vehicle q traveling on a multi-lane highway, the future lane change intent is provided as a function of previous states of the vehicle as well as the previous states of neighboring vehicles. As an additional explanation of how the S-RNN 250 is derived, the six-vehicle graph 300 accounts for the various configurations of the nearby vehicles as previously outlined. According to this defined positioning of FIG. 3, for the vehicle $v^q$ 100, the nearby vehicles ahead and behind are in the left lane are $v^0$ and $v^1$, the nearby vehicles ahead and behind $v^q$ 100 in the same lane are $v^2$ and $v^3$, and the nearby vehicles ahead and behind $v^q$ 100 in the right lane are $v^4$ and $v^5$.

In general, it is not guaranteed that each of the positions shown in FIG. 3 are actually occupied by a nearby vehicle since other vehicles may be out of sensor range or since the vehicle 100 is traveling in the extreme left or right lane or the vehicle 100 is traveling on a roadway with less than 3 lanes. Thus, the lane prediction system 170 accounts for a neighborhood of six vehicles since it provides a representation of a context of the vehicle 100 that may be considered a minimalist representation. Thus, the factor graph 400 augments the state of each nearby vehicle $v^j$ at each time step $t-t_h$ to t with an indicator variable of 1 for when it is present in the neighborhood of the vehicle 100 and 0 for when it is not.

Continuing with the derivation of the S-RNN 250 and explanation of the factor graph 400, given the three-lane structure of the target neighborhood, the factor graph 400 representing the probability of the future lane change label using edges that represent the interaction between vehicles in each lane (m∈M, where M={left, right, same/no change}) with the target vehicle is as follows:

$$P(Y_{t_f} = m, y_t, \ldots, y_{t_h}, V^q_t, V^0_t, \ldots, V^5_t) = \quad (1)$$

$$\sum_{y_{t_f} \in M/m} P(y_{t_f}, y_t, \ldots, y_{t_h}, V^q_t, V^0_t, \ldots, V^5_t) =$$

$$\sum_{y_{t_f} \in M/m} P(v^q_{t_h}, v^0_{t_h}, \ldots, v^5_{t_h}) \prod_{k=t_h}^{t} (P(y_{k+1} | v^q_k, v^0_k, \ldots, v^5_k)$$

$$P(v^q_k, v^0_k, \ldots, v^5_k | v^q_{k-1}, v^0_{k-1}, \ldots, v^5_{k-1})).$$

The probability distributions in equation (1) are further factorized based on the assumptions of conditional independence between lanes and Markovian temporal dynamics:

$$P(y_{k+1} | v^q_k, v^0_k, \ldots, v^5_k) = \quad (2)$$
$$P(y_{k+1} | v^q_k, v^0_k, v^1_k) P(y_{k+1} | v^q_k, v^2_k, v^3_k) P(y_{k+1} | v^q_k, v^4_k, v^5_k) =$$
$$\phi_l(y_{k+1}, v^q_k, v^0_k, v^1_k) \phi_s(y_{k+1}, v^q_k, v^2_k, v^3_k) \phi_r(y_{k+1}, v^q_k, v^4_k, v^5_k),$$

$$P(v^q_k, v^0_k, \ldots v^5_k | v^q_{k-1}, v^0_{k-1}, \ldots, v^5_{k-1}) = \quad (3)$$
$$P(v^q_k, v^0_k, v^1_k | v^q_{k-1}, v^0_{k-1}, v^1_{k-1}) P(v^q_k, v^2_k, v^3_k | v^q_{k-1}, v^2_{k-1}, v^3_{k-1})$$
$$P(v^q_k, v^4_k, v^5_k | v^q_{k-1}, v^4_{k-1}, v^5_{k-1}) =$$
$$\gamma_l(y_{k+1}, v^q_k, v^0_k, v^1_k) \gamma_s(y_{k+1}, v^q_k, v^2_k, v^3_k) \gamma_r(y_{k+1}, v^q_k, v^4_k, v^5_k),$$

where each $\varphi(\cdot)$ and $\gamma(\cdot)$ is a parameterization of the spatiotemporal and temporal factor functions, respectively, and where l, r, and s denote the left, right, and same lanes, respectively. The final lane change prediction $y^i_t$ is given by:

$$y_{t_f}^q = \underset{m \in M}{\mathrm{argmax}} P(Y_{t_f} = m, y_t, \ldots, y_{t_h}, V_t^q, V_t^0, \ldots, V_t^5). \quad (4)$$

By parameterizing each of the three-lane factors using the time histories of each of the nearby vehicles in the lane along with the vehicle 100, the model of the graph 400 is permitted to take into account spatiotemporal interactions between each of the vehicles used in each factor.

Factor functions, $\varphi(\bullet)$ and $\gamma(\bullet)$, may be parameterized to incorporate tuned features with simple weights. However, this approach encounters difficulties with manual parameterization and thus may not be optimal. Accordingly, in one embodiment, the model of the factor graph 400 is converted into the Structural-RNN 250 and trained to classify the lane change label (e.g., generate the prediction indicators). Developing the S-RNN 250 in this manner facilitates the lane prediction system 170 with using the sequence modeling power of RNNs together with the structure provided by the spatiotemporal factor graph 400.

Figure 5:
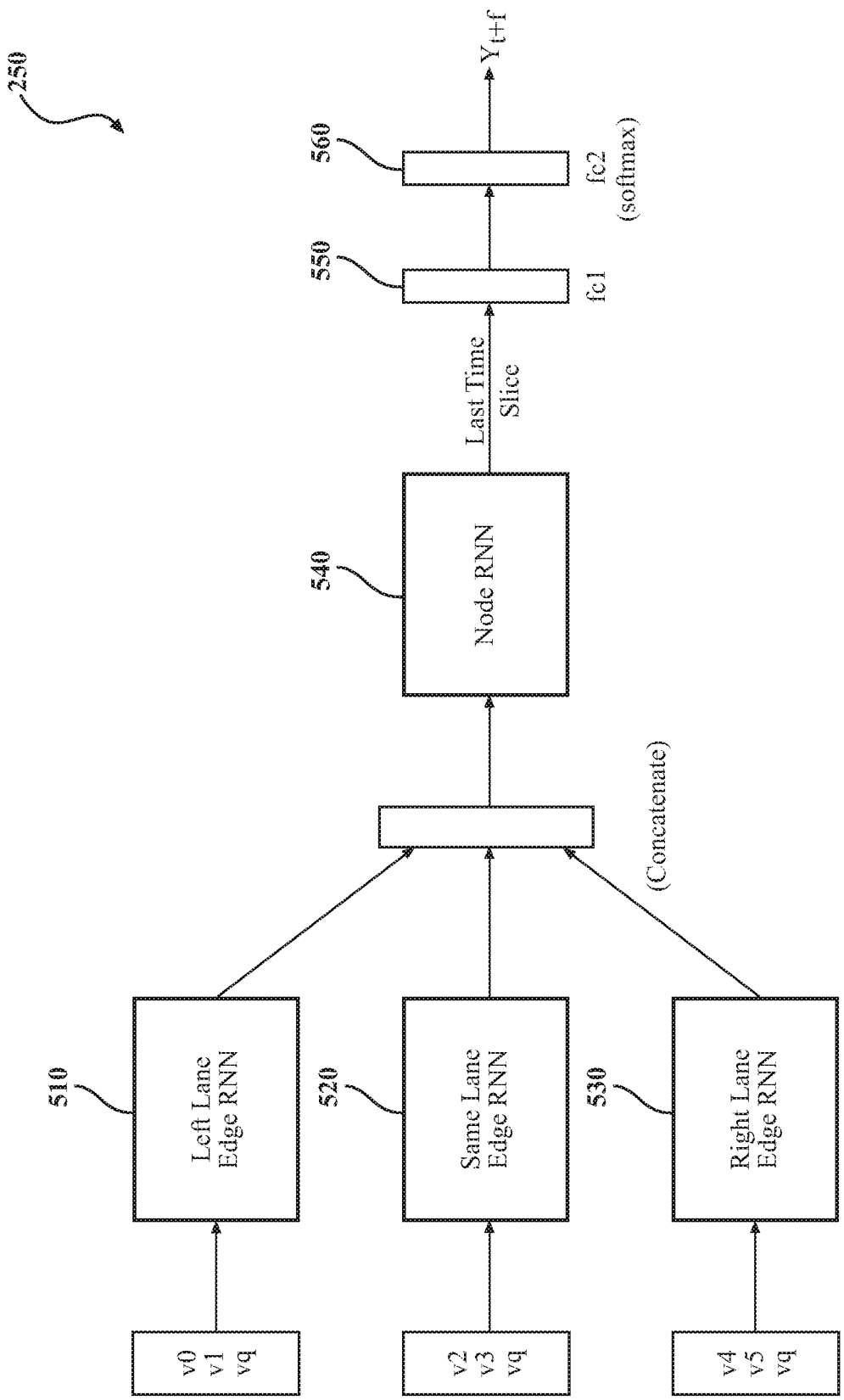
FIG. 5 is a diagram illustrating one embodiment of an architecture for the structural RNN (S-RNN) derived from the factor graph of FIG. 4.

To convert the graph 400 into the Structural RNN 250, recurrent units such as long short-term memory units (LSTMs) are used to represent each of the factors as factorRNNs, which are shown in FIG. 5 as blocks 510, 520, and 530. LSTMs are recurrent models that include two types of recurrent hidden states (memory) that are tracked over each time step. These states are the hidden output state h and hidden context state c, and, in one embodiment, both of the hidden states are computed using recurrent functions with parameters that can be learned from data. This property of LSTMs allows for the further simplification of the lane change prediction model by using a single LSTM unit for both the vehicle interaction factor $\varphi(\bullet)$ and vehicle dynamics factor $\gamma(\bullet)$ for a given lane (left, right, or same). Specifically, the recurrent output function is, for example, used as the vehicle interaction factor $\varphi(\bullet)$, and the recurrent context function is used as the vehicle dynamics factor $\gamma(\bullet)$.

Moreover, a detailed representation of the S-RNN 250 is illustrated in FIG. 5. Since the graph 400 includes one random variable node 440, the Structural RNN 250 has one nodeRNN 540 to combine the outputs of each factorRNN 510, 520, and 530. During the forward pass of the Structural RNN 250, each vehicle state at each time step is passed through the factorRNNs 510-530 which provide factors as outputs that are concatenated and then passed through the nodeRNN 540. The following equations detail the computation performed at each time step by the prediction module 230 implementing the S-RNN 250, noting that $h^i$ is the output of the $i^{th}$ RNN unit at time step k in the range $[t_h, t]$, and that the scripts l, r, s, and n mean left lane, right lane, same lane, and node, respectively:

$$(h_k^l, c_k^l) = \mathrm{LSTM}_l([v_k^0; v_k^1; v_k^q], h_{k-1}^l, c_{k-1}^l), \quad (5)$$

$$(h_k^s, c_k^s) = \mathrm{LSTM}_s([v_k^2; v_k^3; v_k^q], h_{k-1}^s, c_{k-1}^s), \quad (6)$$

$$(h_k^r, c_k^r) = \mathrm{LSTM}_r([v_k^4; v_k^5; v_k^q], h_{k-1}^r, c_{k-1}^r), \quad (7)$$

$$(h_k^n, c_k^n) = \mathrm{LSTM}_n([h_k^l; h_k^s; h_k^q], h_{k-1}^n, c_{k-1}^n), \quad (8)$$

The output for the final time step t of the nodeRNN 540 is then fed by the prediction module 230 through two fully connected layers 550 and 560 of the S-RNN 250 to get the final lane change classification (i.e., prediction indicators) as follows:

$$f_t = \sigma(W_1 h_t^n + b_1), \quad (9)$$

$$y_{t_f}^q = \mathrm{softmax}(W_2 f_t + b_2) \quad (10)$$

where each W and b are the weights and biases for the fully connected layers 550 and 560, $\sigma(\bullet)$ is the sigmoid function used as the nonlinear activation function for the first fully-connected layer 550, and $y_{t_f}$ is the prediction output for the future lane change maneuver that will occur $t_f + f$ steps into the future. One embodiment of the complete architecture of the S-RNN 250 is shown in FIG. 5. In one embodiment, the S-RNN 250 is trained end-to-end using sensor data of natural interstate highway driving data obtained from an autonomous vehicle driving amongst vehicles controlled manually by human drivers.

Additionally, in one embodiment, a softmax cross entropy loss is implemented as a classification loss function for the S-RNN 250. Moreover, the S-RNN 250 is implemented, in one embodiment, to learn factor graph models that represent how the nearby vehicles affect a decision of autonomous driving logic within the vehicle 100 to perform a lane change maneuver. In this way, the lane prediction system 170 learns and predicts lane changes for nearby vehicles to facilitate path planning, emergency maneuvers, and/or further functions related to such determinations.

That is, in one embodiment, the lane prediction system 170 is configured in a manner so as to predict the lane changes and provide the predictions to additional aspects of the vehicle 100 such as the autonomous driving module 160. In further aspects, the lane prediction system 170 controls aspects of the vehicle 100 directly such as controlling the vehicle 100 to execute an emergency maneuver (e.g., pull-over) and/or to render visual display alerts or audible alerts to occupants of the vehicle 100. In this way, the lane prediction system 170 improves the operation of the vehicle 100 by improving planning and execution of maneuvers, improving the operation of one or more computers through more efficient planning, improving safety through better awareness of possible maneuvers, and so on.

Figure 6:
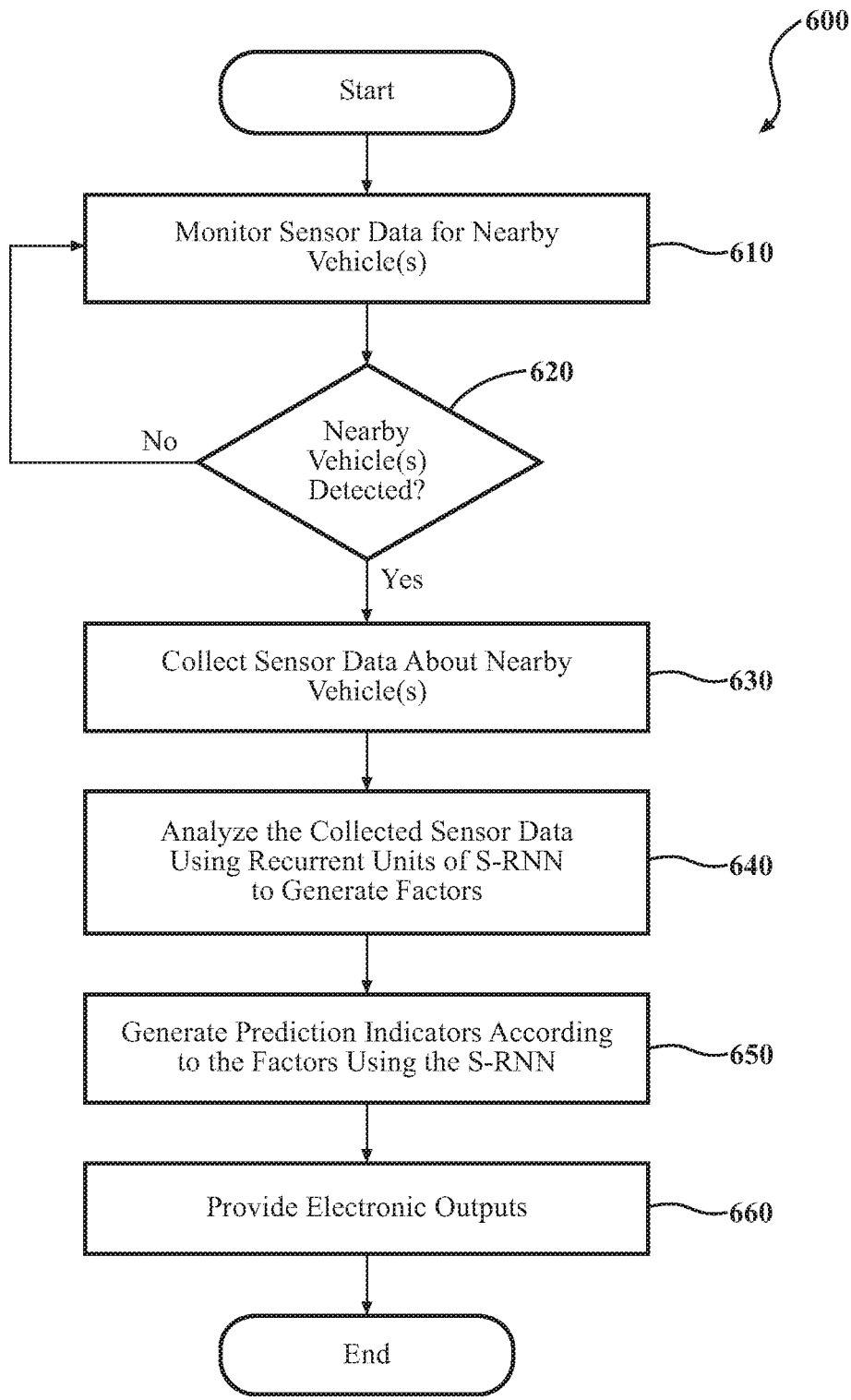
FIG. 6 illustrates one embodiment of a method associated with predicting lane changes of surrounding vehicles using a structural-RNN.

Additional aspects of using a structural-RNN to predict lane changes of nearby vehicles will be discussed in relation to FIG. 6. FIG. 6 illustrates a flowchart of a method 600 that is associated with predicting lane changes of nearby vehicles that are proximate to a host vehicle. Method 600 will be discussed from the perspective of the lane prediction system 170 of FIGS. 1, and 2. While method 600 is discussed in combination with the lane prediction system 170, it should be appreciated that the method 600 is not limited to being implemented within the lane prediction system 170, but is instead one example of a system that may implement the method 600.

As an initial matter, it should be understood that the S-RNN 250 is implemented and trained in advance of real-world use to predict lane changes while the vehicle 100 is operating. That is, prior to use for actively predicting lane changes within the vehicle 100 while the vehicle 100 is navigating, the S-RNN 250 is trained to learn factor functions for respective lanes about the vehicle 100 and determine likelihoods of different maneuvers therefrom. Moreover, it should be appreciated that the training itself can take many different forms. In one example, the S-RNN 250 is trained via, for example, the prediction module 230 using training sensor data that is acquired from other vehicles that have collected that data on trips through various locations. The training sensor data can include data that correlates with types of the sensor data 260. Thus, the training sensor data can include LIDAR data, camera images, GPS data, IMU data, and so on.

Furthermore, the training may be supervised or unsupervised. In either case, the training of the S-RNN 250 is end-to-end. That is, the S-RNN 250 is trained to output predictions of lane changes according to the sensor data that is provided into the S-RNN 250 for training. Accordingly, through training the S-RNN 250 weights and biases of different nodes within the S-RNN 250 are adjusted over the training process until the provided outputs are, for example, sufficiently accurate or meet another indicator that specifies adequate training.

Once the S-RNN 250 is trained, the lane prediction system 170 is, for example, prepared for predicting lane changes of nearby vehicles. Thus, the method 600 initiates, at 610, with the monitoring module 220 monitoring the sensor data 260 for indicators of a presence of the nearby vehicles. That is, in one embodiment, the monitoring module 220 continuously monitors the sensor data 260 as the sensor data 260 is acquired from the vehicle sensors 120 for characteristics of vehicles that are or will be proximate to the vehicle 100. For example, in one approach, the monitoring module 220 detects the nearby vehicles when a nearby vehicle approaches the host vehicle 100 within a defined distance (e.g., 100 m). Thus, the monitoring module 220 can monitor/analyze images, lidar data, radar, and/or another source of information to detect when another vehicle is present.

It should be appreciated that the monitoring module 220 can implement various approaches to identify whether a detected object that is proximate to the vehicle 100 is a vehicle. For example, the monitoring module 220, in one approach, analyzes images of objects using a convolutional neural network (CNN) or another image recognition technique in order to classify the object as a vehicle. Moreover, while vehicles are generally discussed as being the objects for which lane changes are predicted, of course, in further aspects, the objects may be motorcycles, bicycles, and so on.

At 620, the monitoring module 220 either determines that a nearby vehicle has not been detected and returns to monitoring as discussed at block 610, or determines that one or more nearby vehicles are present and proceeds to collect sensor data as discussed subsequently at block 630.

As a further matter, the monitoring module 220, in one embodiment, in addition to detecting the one or more nearby vehicles, also correlates the nearby vehicles with positions of the context diagram 300 as previously discussed. That is, the monitoring module 220 initially determines a number of lanes on a present roadway on which the host vehicle 100 is traveling. The monitoring module 220 then, for example, localizes the vehicle 100 on the roadway to determine a present lane of travel. In this way, the monitoring module 220 can determine a configuration of lanes around the vehicle 100 and thus whether other vehicles can be to the left and/or to the right of the vehicle 100.

By way of example, if the vehicle 100 is traveling on a two-lane highway in the right lane, then the vehicle 100 is aware of the lane to the left, the present lane, and that there is no lane to the right. Accordingly, the monitoring module 220 can provide this information to the prediction module 230 in order to appropriately inform the respective recurrent units (e.g., unit 530) that there is not nearby vehicle present and movements in the direction of the right lane are not possible. Moreover, the monitoring module 220 can assign identifiers to the sensor data 260 about the different ones of the nearby vehicles in order to annotate a relative location in relation to the host vehicle 100 and specifically correlating to positions $V_0$-$V_5$ in the diagram 300.

At 630, the monitoring module 220 collects the sensor data 260 about the nearby vehicle(s) and, for example, the surrounding environment. In one embodiment, the monitoring module 220 continuously collects in real-time the sensor data 260 from various sensors of the vehicle sensor system 120 in order to maintain an up-to-date perception of the surrounding environment. Accordingly, when the monitoring module 220 detects a nearby vehicle, particular aspects of the sensor data 260 are, for example, annotated in order to highlight the nearby vehicle.

In general, the sensor data 260 includes at least pose information about the nearby vehicles. The pose information is comprised of a position, orientation, and trajectory of the nearby vehicle. In further aspects, the sensor data 260 can also include map data (e.g., satellite photos of roadways, electronic map data, etc.). In still further aspects, the sensor data 260 can include additional information about the surrounding environment such as roadway conditions, the presence of obstacles or other objects, and so on. Thus, the prediction module 230, in one embodiment, uses additional information to the pose information when predicting the lane changes (e.g., changes in lane configurations, etc.).

At 640, the prediction module 230 analyzes the sensor data 260 about the nearby vehicles using separate recurrent units to generate factors for respective lanes that correspond with the nearby vehicles. In one embodiment, the prediction module 230 provides sensor data 260 to the separate recurrent units (e.g., recurrent units 510, 520, and 530) for nearby vehicles of the respective lane along with sensor data about the host vehicle 100. For example, as shown in equations (5)-(7) above, the recurrent units accept data about the respective nearby vehicles and the node vehicle (e.g., the host 100). In general, the sensor data includes at least the pose information, as previously noted, but also can include further information that informs the determination such as lane configuration, obstacles, etc. In either case, the prediction module 230 outputs the factors for the respective lanes after processing the respective sensor data 260 using the correlating recurrent units 510, 520, and 530.

At 650, the prediction module 230 generates prediction indicators for the nearby vehicles as a function of the factors and using the S-RNN 250. In one embodiment, the prediction module 230 further processes the factors according to the S-RNN 250 as shown in the representative structures of FIG. 5. That is, the prediction module 230 implements the S-RNN 250 to iteratively generate the prediction indicators at successive time steps to maintain the prediction indicators to a prediction horizon (e.g., 3 s). The prediction indicators are, in essence, indicators that forecast whether the respective nearby vehicle will change lanes upto the prediction horizon.

As shown in FIG. 5, the prediction module 230 iteratively processes the sensor data 260 at a nodeRNN 540 and through at least two fully connected layers 550 and 560 using both the present factors and the sensor data 260 along with a history of observations (e.g., previous determinations). In one embodiment, the history of observations can reach back one to five seconds depending on aspects of the particular implementation. In either case, the prediction module 230 generates the prediction indicators for the nearby vehicles using past data. That is, if the sensors 120 become compromised from, for example, sensor failures or another reason and additional data is not available, the system 170 can nevertheless provide the prediction indicators reliably out to at least the prediction horizon (e.g., 1-3 seconds).

At 660, the prediction module 230 provides electronic outputs identifying the prediction indicators. In general, as previously noted, the prediction indicators specify a likelihood of the nearby vehicles changing between the lanes and also a type of change (e.g., to the left or the right). In one embodiment, the prediction module 230 provides the electronic outputs to one or more of the vehicle systems 140. Alternatively, or additionally, the prediction module 230 provides the electronic outputs via a communications bus or via another means to the autonomous driving module 160. In either case, the prediction module 230 provides/communicates the electronic outputs to cause the noted aspects of the vehicle 100 to adjust operation and account for the predicted lane changes by the nearby vehicles. In this way, the lane prediction system 170 can control various aspects of the vehicle 100 to improve safety and navigation through anticipating movements of the nearby vehicles.

For example, in one embodiment, the prediction module 230 provides the electronic outputs to the autonomous driving module 160, which causes the module 160 to execute path planning through the surrounding environment that accounts for a predicted lane change. Thus, the autonomous driving module 160 generates a path that is adjusted to avoid a collision with the nearby vehicle that is changing lanes. In further aspects, the prediction module 230 provides the electronic outputs to initiate alerts to the driver, to inform advanced driver assistance systems, and so on.

Figure 7:
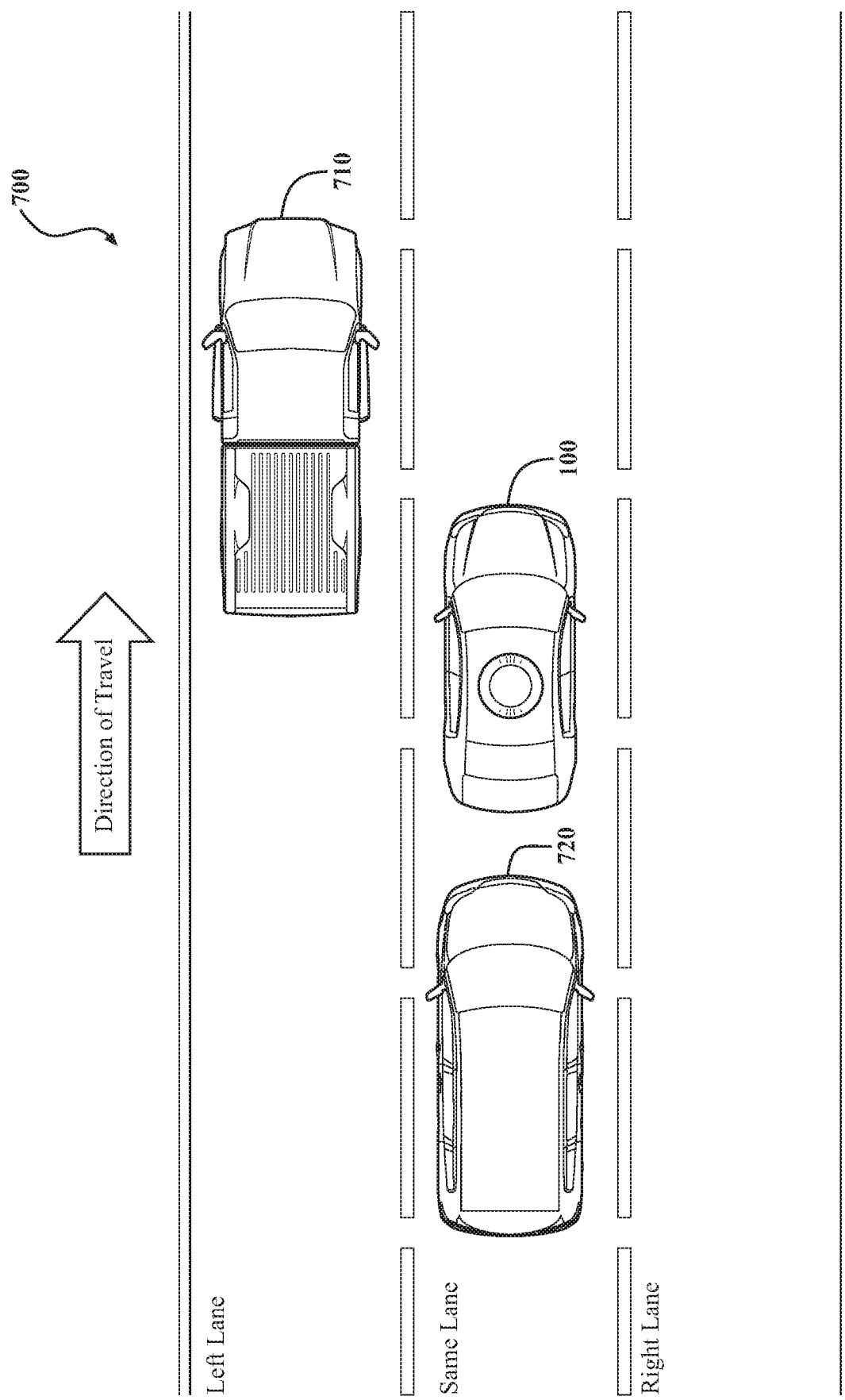
FIG. 7 is a diagram illustrating one example configuration of nearby vehicles that may be encountered by the host vehicle.

As a further example of how the lane prediction system 170 functions, attention will now be directed to FIG. 7. FIG. 7 illustrates a diagram 700 of an example configuration of nearby vehicles around the host vehicle 100. For purposes of the example illustrated within diagram 700, assume that the monitoring module 220 has already detected the presence of the nearby vehicle 710 and the nearby vehicle 720. Accordingly, the monitoring module 220 controls the vehicle sensors 120 to collect the sensor data 260 about the nearby vehicle 710 that is in the left lane and the nearby vehicle 720 that is behind the vehicle 100 in the same lane.

As such, the prediction module 230 uses the sensor data 260 as an electronic input into the respective recurrent units 510, 520, and 530 of the S-RNN 250. In the instant example, the prediction module 230 provides information about the nearby vehicle 710 into the left lane recurrent unit 510, information about the nearby vehicle 720 into the same lane recurrent unit 520, and empty position indicators to the right lane recurrent unit 530. Moreover, each of the recurrent units 510, 520, and 530 are also provided information about the host vehicle 100 and information regarding empty positions with the respective lanes. In further aspects, the recurrent units 510-530 and/or subsequent functional blocks of the S-RNN 250 (e.g., node 540, FC 550-560) can be provided with map data indicating changes in lanes or other information about the roadway that may influence lane changing by the nearby vehicles. The empty positions are positions identified in the diagram 300 $V_0$-$V_5$ which are not presently occupied by a nearby vehicle. Accordingly, the prediction module 230 uses the S-RNN 250 that is derived from the factor graph 400 to generate the prediction indicators.

In the present example, the prediction indicators that are provided as electronic outputs by the prediction module 230 may facilitate the functioning of several different aspects of the vehicle 100. For example, the prediction indicators can anticipate if the nearby vehicle 710 is likely to cut off the vehicle 100 and thus provide for maneuvering the vehicle 100 to prevent a collision or other dangerous circumstance. Moreover, the host vehicle 100 may use the prediction indicators to determine when the nearby vehicle 720 is likely to change lanes and thus maneuver into a blind spot of the vehicle 100. Accordingly, the host vehicle 100 may use the prediction indicators to pre-emptively alert a driver or perform an autonomous maneuver as a result thereof. In either case, the lane prediction system 170 provides for improvements in both safety and operation of autonomous systems through better anticipating movements of nearby vehicles and also providing for improved emergency planning/maneuvering in circumstances of sensor failure.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the lane prediction system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the lane prediction system 170, and/or the autonomous driving module(s) 160 may control some or all of these vehicle systems 140 and, thus, may be partially or fully autonomous.

The processor(s) 110, the lane prediction system 170, and/or the autonomous driving module(s) 160 can be operatively connected to communicate with the various vehicle systems 140 and/or individual components thereof. For example, returning to FIG. 1, the processor(s) 110, the lane prediction system 170, and/or the autonomous driving module(s) 160 can be in communication to send and/or receive information from the various vehicle systems 140 to control the movement, speed, maneuvering, heading, direction, etc. of the vehicle 100. The processor(s) 110, the lane prediction system 170, and/or the autonomous driving module(s) 160 may control some or all of these vehicle systems 140.

The processor(s) 110, the lane prediction system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the lane prediction system 170, and/or the autonomous driving module(s) 160 can control the direction and/or speed of the vehicle 100. The processor(s) 110, the lane prediction system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the lane prediction system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the S-RNN 250 as implemented by the prediction module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A lane prediction system for predicting lane changes for nearby vehicles of a host vehicle, comprising:
   one or more processors;
   a memory communicably coupled to the one or more processors and storing:
   a monitoring module including instructions that when executed by the one or more processors cause the one or more processors to, in response to detecting that one or more of the nearby vehicles are present nearby the host vehicle, collect, using at least one sensor of the host vehicle, pose information about the nearby vehicles, the pose information including at least one of a position, an orientation, and a trajectory of the one or more of the nearby vehicles relative to the host vehicle,
wherein the one or more of the nearby vehicles are traveling in lanes of a roadway proximate to the host vehicle and in a direction of travel of the host vehicle; and a prediction module including instructions that when executed by the one or more processors cause the one or more processors to:
analyze the pose information of the nearby vehicles using separate recurrent units of a structural recurrent neural network (S-RNN) to generate factors according to the lanes, wherein the prediction module includes instructions to analyze the pose information including instructions to associate the nearby vehicles with a discrete set of separate positions defined by a factor graph relative to the host vehicle,
wherein the recurrent units correlate with factors of respective ones of the lanes and spatiotemporal interactions of respective ones of the nearby vehicles in the respective ones of the lanes, and
wherein the recurrent units are mapped to the discrete set of separate positions from the factor graph including separate ones of the recurrent units for separate lanes about the host vehicle,
generate prediction indicators for the nearby vehicles as a function of the factors for the lanes using the S-RNN, and
provide electronic outputs identifying the prediction indicators that specify a likelihood of the nearby vehicles changing between the lanes.

2. The lane prediction system of claim 1, wherein the recurrent units correspond with the lanes including three lanes about the host vehicle and for each of the three lanes including two representative vehicles, and
wherein the factor graph defines two positions for each of the lanes of the roadway for the nearby vehicles to define approximately six separate positions in the discrete set of separate positions neighboring the host vehicle including at least ahead and behind of the host vehicle.

3. The lane prediction system of claim 2, wherein the recurrent units are long short-term memory (LSTM) recurrent units,
wherein the discrete set of positions are whole lane positions relative to the host vehicle defined according to the lanes and do not specify positions between lanes, and
wherein the nearby vehicles neighbor the host vehicle adjacently without additional vehicles intervening between the one or more nearby vehicles and the host vehicle.

4. The lane prediction system of claim 1, wherein the prediction module includes instructions to generate the prediction indicators including instructions to iteratively generate the prediction indicators at successive time steps to maintain the prediction indicators to a prediction horizon that is a defined period of time into the future for which the prediction indicators are forecast,
wherein the pose information includes at least the position, the orientation, and the trajectory of the one or more of the nearby vehicles relative to the host vehicle, and wherein the recurrent units are associated with a left lane that is directly to a left of the host vehicle, a same lane as the host vehicle, and a right lane that is directly to a right of the host vehicle.

5. The lane prediction system of claim 1, wherein the monitoring module includes instructions to detect that the one or more of the nearby vehicles are present includes instructions to identify that the one or more of the nearby vehicles are within a defined distance of the host vehicle by monitoring sensor data for indicators of a presence of the nearby vehicles, and
wherein the monitoring module includes instructions to detect the one or more of the nearby vehicles including instructions to analyze map data for the roadway on which the host vehicle is traveling to determine a number of the lanes for a direction of travel of the host vehicle.

6. The lane prediction system of claim 1, wherein the prediction module includes instructions to provide the electronic outputs including instructions to provide the electronic outputs to cause an autonomous driving module, using at least the one or more processors, to execute path planning for controlling the host vehicle according to the electronic outputs.

7. The lane prediction system of claim 1,
wherein the prediction module further includes instructions to train, using stored sensor data, the S-RNN to learn separate factor functions of the factor graph for the lanes, wherein the recurrent units are structured to correlate with the factor graph, and wherein generating the prediction indicators includes concatenating the factors and analyzing the concatenated factors with a node RNN of the S-RNN, and wherein training the S-RNN includes learning weights and biases for fully connected layers in the S-RNN.

8. The lane prediction system of claim 1, wherein the host vehicle is an autonomous vehicle.

9. A non-transitory computer-readable medium storing instructions for predicting lane changes for nearby vehicles of a host vehicle and that, when executed by one or more processors, cause the one or more processors to:
in response to detecting that one or more of the nearby vehicles are present nearby the host vehicle, collect, using at least one sensor of the host vehicle, pose information about the nearby vehicles, the pose information including at least one of a position, an orientation, and a trajectory of the one or more of the nearby vehicles relative to the host vehicle,
wherein the one or more of the nearby vehicles are traveling in lanes of a roadway proximate to the host vehicle and in a direction of travel of the host vehicle;
analyze the pose information of the nearby vehicles using separate recurrent units of a structural recurrent neural network (S-RNN) to generate factors according to the lanes,
wherein the instructions to analyze the pose information include instructions to associate the nearby vehicles with a discrete set of separate positions defined by a factor graph relative to the host vehicle,
wherein the recurrent units correlate with factors of respective ones of the lanes and spatiotemporal interactions of respective ones of the nearby vehicles in the respective ones of the lanes, and wherein the recurrent units are mapped to the discrete set of separate positions from the factor graph including separate ones of the recurrent units for separate lanes about the host vehicle;
generate prediction indicators for the nearby vehicles as a function of the factors for the lanes using the S-RNN; and provide electronic outputs identifying the prediction indicators that specify a likelihood of the nearby vehicles changing between the lanes.

10. The non-transitory computer-readable medium of claim 9, wherein the recurrent units correspond with the lanes including three lanes about the host vehicle and for each of the three lanes including two representative vehicles, and
wherein the factor graph defines two positions for each of the lanes of the roadway for the nearby vehicles to define approximately six separate positions in the discrete set of separate positions neighboring the host vehicle including at least ahead and behind of the host vehicle.

11. The non-transitory computer-readable medium of claim 9, wherein the instructions to generate the prediction indicators include instructions to iteratively generate the prediction indicators at successive time steps to maintain the prediction indicators to a prediction horizon that is a defined period of time into the future for which the prediction indicators are forecast,
wherein the pose information includes at least the position, the orientation, and the trajectory of the one or more of the nearby vehicles relative to the host vehicle, and wherein the recurrent units are associated with a left lane that is directly to a left of the host vehicle, a same lane as the host vehicle, and a right lane that is directly to a right of the host vehicle.

12. The non-transitory computer-readable medium of claim 9, wherein the instructions to detect that the one or more of the nearby vehicles are present includes instructions to identify that the one or more of the nearby vehicles are within a defined distance of the host vehicle by monitoring sensor data for indicators of a presence of the nearby vehicles, and
wherein the instructions to detect the one or more of the nearby vehicles include instructions to analyze map data for the roadway on which the host vehicle is traveling to determine a number of the lanes for a direction of travel of the host vehicle.

13. The non-transitory computer-readable medium of claim 9, wherein the instructions to provide the electronic outputs include instructions to provide the electronic outputs to cause an autonomous driving module, using at least a processor, to execute path planning for controlling the host vehicle according to the electronic outputs.

14. A method of predicting lane changes for nearby vehicles of a host vehicle, comprising:
in response to detecting that one or more of the nearby vehicles are present nearby the host vehicle, collecting, using at least one sensor of the host vehicle, pose information about the nearby vehicles, the pose information including at least one of a position, an orientation, and a trajectory of the one or more of the nearby vehicles relative to the host vehicle,
wherein the one or more nearby vehicles are traveling in lanes of a roadway proximate to the host vehicle and in a direction of travel of the host vehicle;
analyzing the pose information of the nearby vehicles using separate recurrent units of a structural recurrent neural network (S-RNN) to generate factors according to the lanes,
wherein analyzing the pose information includes associating the nearby vehicles with a discrete set of separate positions defined by a factor graph relative to the host vehicle,
wherein the recurrent units correlate with factors of respective ones of the lanes and spatiotemporal interactions of respective ones of the nearby vehicles in the respective ones of the lanes, and wherein the recurrent units are mapped to the discrete set of separate positions from the factor graph including separate ones of the recurrent units for separate lanes about the host vehicle;
generating prediction indicators for the nearby vehicles as a function of the factors for the lanes using the S-RNN; and
providing electronic outputs identifying the prediction indicators that specify a likelihood of the nearby vehicles changing between the lanes.

15. The method of claim 14, wherein the recurrent units correspond with the lanes including three lanes about the host vehicle and for each of the three lanes including two representative vehicles, and
wherein the factor graph defines two positions for each of the lanes of the roadway for the nearby vehicles to define approximately six separate positions in the discrete set of separate positions neighboring the host vehicle including at least ahead and behind of the host vehicle.

16. The method of claim 15, wherein the recurrent units are long short-term memory (LSTM) recurrent units,
wherein the discrete set of positions are whole lane positions relative to the host vehicle defined according to the lanes and do not specify positions between lanes, and
wherein the nearby vehicles neighbor the host vehicle adjacently without additional vehicles intervening between the one or more nearby vehicles and the host vehicle.

17. The method of claim 14, wherein generating the prediction indicators includes iteratively generating the prediction indicators at successive time steps to maintain the prediction indicators to a prediction horizon that is a defined period of time into the future for which the prediction indicators are forecast,
wherein the pose information includes at least the position, the orientation, and the trajectory of the one or more of the nearby vehicles relative to the host vehicle, and
wherein respective ones the recurrent units are associated with a left lane that is directly to a left of the host vehicle, a same lane as the host vehicle, and a right lane that is directly to a right of the host vehicle.

18. The method of claim 14, wherein detecting that the one or more of the nearby vehicles are present includes identifying that the one or more of the nearby vehicles are within a defined distance of the host vehicle by monitoring sensor data for indicators of a presence of the nearby vehicles, and
wherein detecting the nearby vehicles includes analyzing map data for the roadway on which the host vehicle is traveling to determine a number of the lanes for a direction of travel of the host vehicle.

19. The method of claim 14, wherein providing the electronic outputs includes providing the electronic outputs to cause an autonomous driving module to execute, using at least a processor, path planning for controlling the host vehicle according to the electronic outputs.

20. The method of claim 14, further comprising:
training, using stored sensor data, the S-RNN to learn separate factor functions of a factor graph for the lanes, wherein the recurrent units are structured to correlate with the factor graph, and wherein generating the prediction indicators includes concatenating the factors and analyzing the concatenated factors with a node RNN of the S-RNN, and wherein training the S-RNN includes learning weights and biases for fully connected layers in the S-RNN.

\* \* \* \* \*